UNITED STATES PATENT OFFICE.

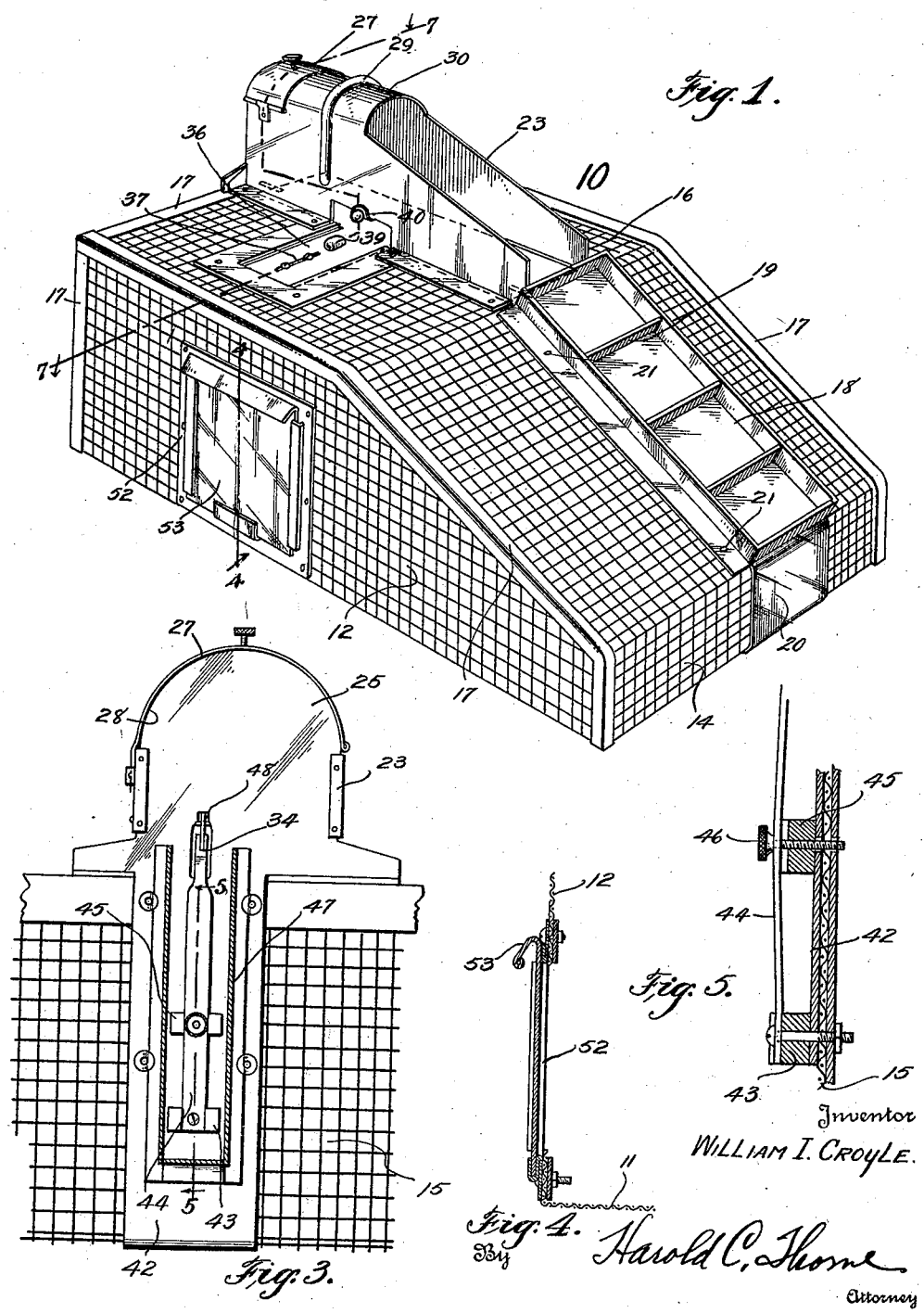

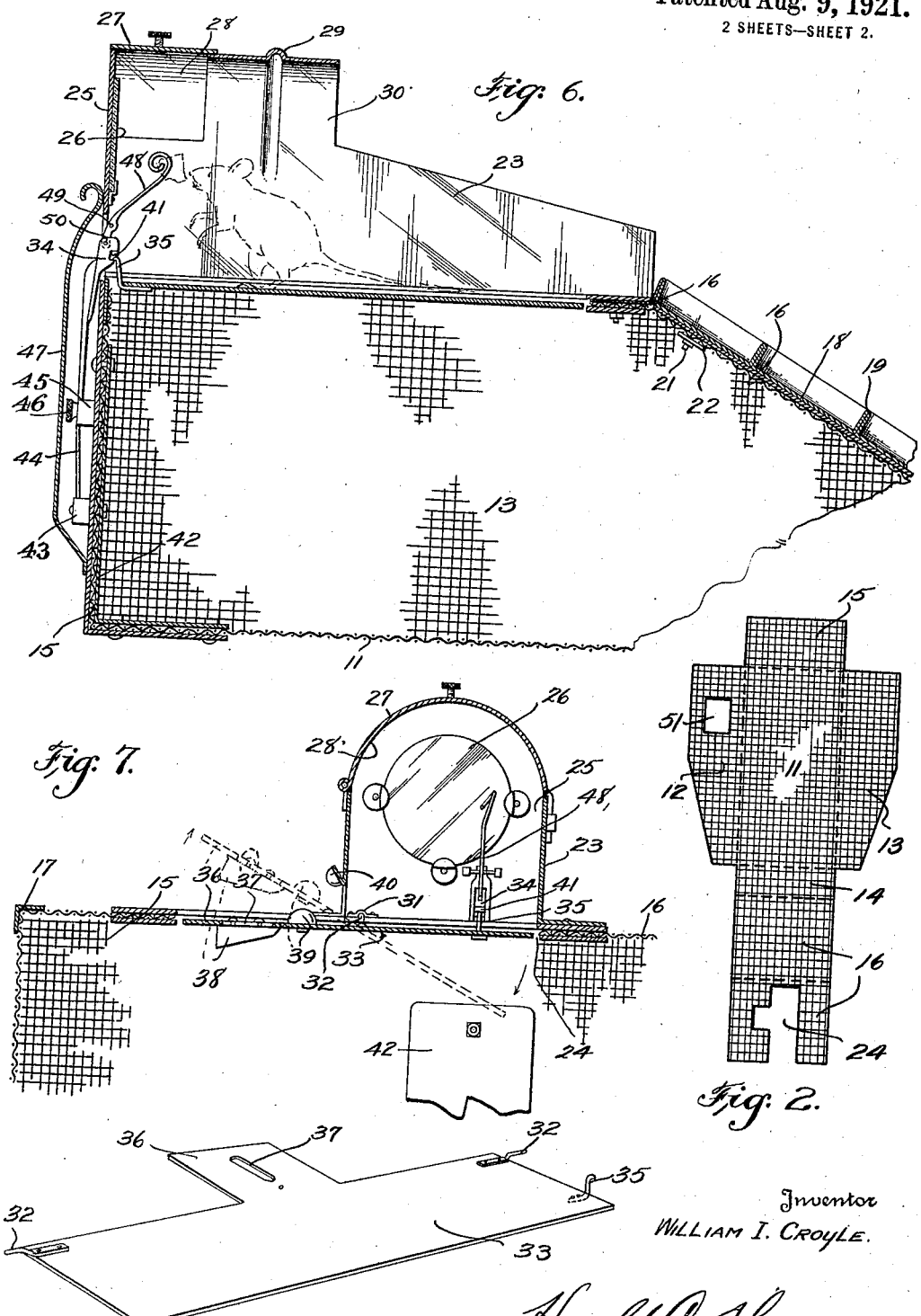

WILLIAM I. CROYLE, OF HEILWOOD, PENNSYLVANIA.

TRAP.

1,387,129.

Specification of Letters Patent.  Patented Aug. 9, 1921.

Application filed February 14, 1921. Serial No. 444,857.

*To all whom it may concern:*

Be it known that I, WILLIAM I. CROYLE, a citizen of the United States, residing at Heilwood, in the county of Indiana and State of Pennsylvania, have invented certain new and useful Improvements in Traps, of which the following is a specification.

This invention relates to animal traps; and the objects of the invention and details of construction will appear as described in connection with the accompanying drawings and hereinafter set forth and claimed.

Referring to the drawings forming a part of this specification, like characters of reference designate corresponding parts in the figures, in which,—

Figure 1 is a perspective view of a mouse or rat trap made in accordance with my invention, Fig. 2 is a diagrammatic representation of the blank from which the trap is constructed, on a reduced scale, Fig. 3 is a fragmentary elevation of the rear end of the trap with parts broken away, Fig. 4 is a sectional view on line 4—4 on Fig. 1, Fig. 5 is a sectional view on line 5—5 on Fig. 3, Fig. 6 is a longitudinal sectional view of the trap, Fig. 7 is a transverse sectional view thereof taken on line 7—7 on Fig. 1, and Fig. 8 is a perspective view of the pivoted tilting platform member of the trap.

Referring to the drawings, the trap is generally designated by the reference numeral 10, and consists of a woven wire box structure made from a blank cut from wire mesh and bent to form the base 11 with upwardly extending sides 12 and 13, ends 14 and 15, and top 16. The meeting edges of the sides and top of the blank are suitably bound together with metallic strips bent so as to form angle strips 17, which can be fastened to the wire mesh in any convenient manner as by soldering or welding, etc.

The top 16 of the trap is formed with a horizontal portion leading from the front section 14. On the inclined portion is a platform 18 provided with side members and steps or cleats 19, which may support bits of feed,—formed in any desired manner as by pressing sheet material into shape as shown in Figs. 1 and 6. The base of the platform may extend down the front end of the trap and under the base of the trap as shown at 20, thus forming a substantial support and reinforcing member for the trap. It may be fastened in place by means of bolts or rivets 21 extending through the wire meshes and backing members 22 as shown best in Fig. 6.

A hood 23 extends from the inclined platform, along the horizontal portion over an aperture 24, and to the rear end of the trap; it may be fastened in place in the same manner as the inclined platform. The rear end of the hood is closed by an end member 25, which member may support a mirror 26 facing the entrance to the hood. A hinged cover 27 forms a closure for an opening 28 through the top of the hood adjacent to the rear end thereof, which affords access to the rear of the hood for baiting the trap. In order to strengthen the sheet material of which the hood is made, it is crimped at 29, and this particularly adapts the portion 30 of the hood for use as a handle by which the trap may be carried.

The base of the hood extends around the edge of the opening 24 and is provided with bearings 31, (one of which is shown in Fig. 7), for pivot members 32 of a tilting platform 33 which forms a support for an animal until the catch 34 is withdrawn from the latch 35, as will be hereinafter set forth. The platform also has a portion 36 extending to the left of the pivots 32, which is provided with a longitudinal slot 37 extending radially from the axis of the pivots. A pair of screws are illustrated as supporting a weight 38 which may be adjusted along the slot until the platform is balanced by it. The platform may be constructed of aluminum or any other light material if desired, and rubber buffers may be provided on it at 39 coöperating with a similar buffer 40 on a portion of the hood bent from the side as shown, and a buffer 41 may be mounted in the catch 34, so as to effect a silent operation of the trap.

To the rear end of the trap is mounted a spring support and reinforcing member 42, provided with a block 43 for supporting the spring 44 which carries the catch member 34. A guide block 45 is also mounted on the member 42, and a set screw 46 passes through the spring into it, by means of which the sensitiveness of the spring may be adjusted so as to cause a light or heavy operation of the catch. A casing 47 may be provided to go over the spring for protecting it after it has been adjusted and is supported by the member 42.

A hook or trigger 48 extends upwardly in the rear of the hood adapted to carry bait, and is pivoted at 49 to the member 25 and at 50 with the catch.

It will readily be seen that when the trigger is drawn outward it will release the catch from the latch 35 and the platform will be overbalanced by the weight of the animal and will tilt downwardly and let the animal into the trap. An outlet 51 for the trap may be made as shown in the side 12 for extracting animals therefrom. A frame structure 52 comprising a metal stamping pressed to form a guide way for a sliding closure 53 may be fastened to the wire mesh in the same manner as the hood 23 and inclined platform 18.

Having shown and described one embodiment of my invention, I do not desire to have it limited closely to the specific structure shown, it being understood that changes may be made in material used, form, proportion, and organization of its various parts without departing from the spirit of the invention as indicated by the scope of the appended claims.

What I claim as my invention and desire to secure by Letters Patent is:

1. A trap including a closure member having a portion of the top cut away adjacent to one end of the top to afford an entrance, a balanced tilting platform pivotally supported in said entrance, a latch carried by the tilting platform adjacent to the end of the closure member, a spring mounted on the end of the closure member having a catch on its upper end for coöperating with said latch and a trigger coöperating with said catch for releasing it from the latch for allowing the platform to tilt downwardly.

2. A trap including a closure member having a portion cut away to receive a tilting platform, a latch carried by the tilting platform, a spring having a catch carried at its upper end for coöperating with the latch for releasing it from the latch for allowing the platform to tilt downwardly, and means comprising a set screw below the catch coöperating with said spring whereby it can be adjusted for a light or heavy operation of the catch.

3. A trap comprising a box structure having a top a portion of which is inclined toward one end and a horizontal portion with a portion cut away for an entrance, a cleated platform member on the inclined portion having an extension embracing the lower front end of the box and leading to the upper portion thereof, a hood over the entrance in the upper portion of the top extending from the inclined platform to the rear end of the trap, a tilting platform in said entrance, a supporting member on the back end of the trap extending from the hood member downwardly and under the box, operating mechanism for the platform in the entrance on said member, a casing for covering said mechanism, and a door on the side of the box for emptying the trap.

In testimony whereof I affix my signature.

WILLIAM I. CROYLE.